US009747677B2

(12) United States Patent
Clayton et al.

(10) Patent No.: US 9,747,677 B2
(45) Date of Patent: *Aug. 29, 2017

(54) TRANSMISSION OF IMAGES FOR INVENTORY MONITORING

(71) Applicant: Symbol Technologies, LLC, Holtsville, NY (US)

(72) Inventors: Richard M. Clayton, Manorville, NY (US); Karthik Lakshminarayanan, Ronkonkoma, NY (US); Miklos Stern, Woodmere, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,963

(22) Filed: May 23, 2016

(65) Prior Publication Data

US 2016/0267635 A1    Sep. 15, 2016

Related U.S. Application Data

(63) Continuation of application No. 13/693,503, filed on Dec. 4, 2012, now Pat. No. 9,380,222.

(51) Int. Cl.
*G06T 5/50* (2006.01)
*H04N 7/18* (2006.01)
(Continued)

(52) U.S. Cl.
CPC ............. *G06T 5/50* (2013.01); *G06Q 10/087* (2013.01); *G06T 7/001* (2013.01); *G06T 7/0008* (2013.01);
(Continued)

(58) Field of Classification Search
CPC . G06Q 10/087; G06Q 10/0875; G06Q 20/203
See application file for complete search history.

(56) References Cited

U.S. PATENT DOCUMENTS 5,566,280 A   10/1996  Fukui et al.
5,953,055 A    9/1999  Huang et al.
(Continued)

FOREIGN PATENT DOCUMENTS

EP    2662831    11/2013
GB    2330265    4/1999
(Continued)

OTHER PUBLICATIONS

PCT International Search Report Dated and Written Opinion Apr. 2, 2014 for International Application PCT/2013/070996. available in U.S. Appl. No. 13/693,503 to which priority is claimed.
(Continued)

*Primary Examiner* — Paul Berardesca

(57) ABSTRACT

An example disclosed method includes generating a composite image by merging unblocked portions of first and second images, each of the first and second images being representative of an environment; identifying a blocked portion of the first and second images; determining, by the processor, whether the blocked portion has been blocked for greater than a threshold amount of time; and in response to determining that the blocked portion has been blocked for greater than the threshold amount of time, including the blocked portion in the composite image.

18 Claims, 9 Drawing Sheets

(51) Int. Cl.
*G06Q 10/08* (2012.01)
*H04N 5/272* (2006.01)
*H04N 1/00* (2006.01)
*G06T 7/00* (2017.01)

(52) U.S. Cl.
CPC ......... *H04N 1/00204* (2013.01); *H04N 5/272* (2013.01); *H04N 7/181* (2013.01); *G06T 2207/20221* (2013.01); *G06T 2207/30108* (2013.01); *H04N 2201/0084* (2013.01)

(56) References Cited

U.S. PATENT DOCUMENTS

| | | | |
|---|---|---|---|
| 6,075,905 | A | 6/2000 | Herman et al. |
| 7,925,114 | B2 | 4/2011 | Mai et al. |
| 8,009,864 | B2 | 8/2011 | Linaker et al. |
| 8,094,902 | B2 | 1/2012 | Crandall et al. |
| 8,233,055 | B2 | 7/2012 | Matsunaga et al. |
| 2003/0003925 | A1 | 1/2003 | Suzuki |
| 2008/0025565 | A1 | 1/2008 | Zhang |
| 2009/0206161 | A1 | 8/2009 | Olmstead |
| 2010/0141806 | A1 | 6/2010 | Uemura et al. |
| 2011/0242286 | A1 | 10/2011 | Pace et al. |
| 2012/0075412 | A1* | 3/2012 | Miyamoto ............. G03B 35/00 348/36 |
| 2012/0269383 | A1 | 10/2012 | Bobbitt |

FOREIGN PATENT DOCUMENTS

| | | |
|---|---|---|
| WO | 2007042251 | 4/2007 |
| WO | 2006136958 | 4/2009 |

OTHER PUBLICATIONS

Jan Bohm, "Multi-Image Fusion for Occlusion-Free Facade Texturing" International Archived of the Programmetry, Remote Sensing and Spatial Information Sciences, Jan. 2004, pp. 867-872, XP055105677. available in U.S. Appl. No. 13/693,503 to which priority is claimed.

Arturo Flores et al. "Removing Pedestrians From Google Street View Images", Computer Vision and Pattern Recognition Workshops (CVPRW), 2010 IEEE Computer Society Conference on, IEEE, Picataway, NJ Jun. 13, 2010, pp. 53-58, XP031728442, ISBN 978-1-4244-7029-7; available in U.S. Appl. No. 13/693,503 to which priority is claimed.

Hiroyuki Uchiyama et al. "Removal of Moving Objects From a Street-View Image by Fusing Multiple Image Sequences", Pattern Recognition (ICPR), 2010, 20th International Conference on, IEEE, Piscataway, NJ, August 23, 2010, pp. 3456-3459, XP031772464, ISBN 978-1-4244-7542-1. available in U.S. Appl. No. 13/693,503 to which priority is claimed.

Din-Chang Tseng et al. "A Cloud Removal Approach for Aerial Image Visualization", International Journal of Innovative Computing, Information Control, vol. 9 No. 6, Jun. 2013, pp. 2421-2440, XP055105685, Japan ISSN: 1349-4198. available in U.S. Appl. No. 13/693,503 to which priority is claimed.

Office Action for European Patent Application No. 13805985.2 dated Jun. 9, 2017.

* cited by examiner

TRANSMISSION OF IMAGES FOR INVENTORY MONITORING

RELATED APPLICATION

This patent arises from a continuation of U.S. patent application Ser. No. 13/693,503, filed Dec. 4, 2012, now U.S. Pat. No. 9,380,222, which is hereby incorporated herein by reference in its entirety.

FIELD OF THE INVENTION

The present invention generally relates to transmitting images for planogram compliance, and more particularly to generating and transmitting images to an inventory monitoring system.

BACKGROUND OF THE INVENTION

Maintaining an understanding of current inventory is an important aspect of retail sales operations. Accordingly, various inventory-taking systems and processes have been employed over the years to assist retail store personnel in determining accurate estimates of current inventory. These systems and processes have included manual counting processes and handheld scanner based systems (e.g. barcode scanner systems and, more recently, systems that employ RFID technology), as well as vision-analysis systems. Manual counting processes are time consuming and prone to human error. When compared with manual counting processes and handheld scanner based systems, vision recognition systems have produced significant gains in efficiency and accuracy.

In vision-based inventory analysis system, cameras are generally placed throughout the premises, and periodic images are taken of store shelves. In a battery powered shelf observing system, the camera wakes up every so often to take a picture. The picture is transmitted to an inventory monitoring system which will use the photo to determine planogram compliance and/or approximate fullness of the shelf.

A problem exists in vision systems in that at the particular instant the picture is taken, there is a good chance that parts of the shelf will be blocked by shoppers and/or carts. Thus, many of the pictures will have critical information missing which may prevent the photos from fulfilling their intended purpose, prompting additional pictures to be taken to deal with the uncertainty around the blocked areas. Sending additional pictures shortens the battery life of the cameras. Additionally, when the inventory monitoring system is located off of the premises, the transmission of image data may take place over a cellular wireless networks. In such systems, bandwidth is a significant cost of operating the system. Reducing the number of images transmitted would reduce the cost of operating the system. Reducing that cost would increase the competitiveness and/or margin of any vision-based inventory analysis system. Therefore a need exists for transmission of images for inventory monitoring that reduces operating costs and increases battery life of the cameras used in acquiring images.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
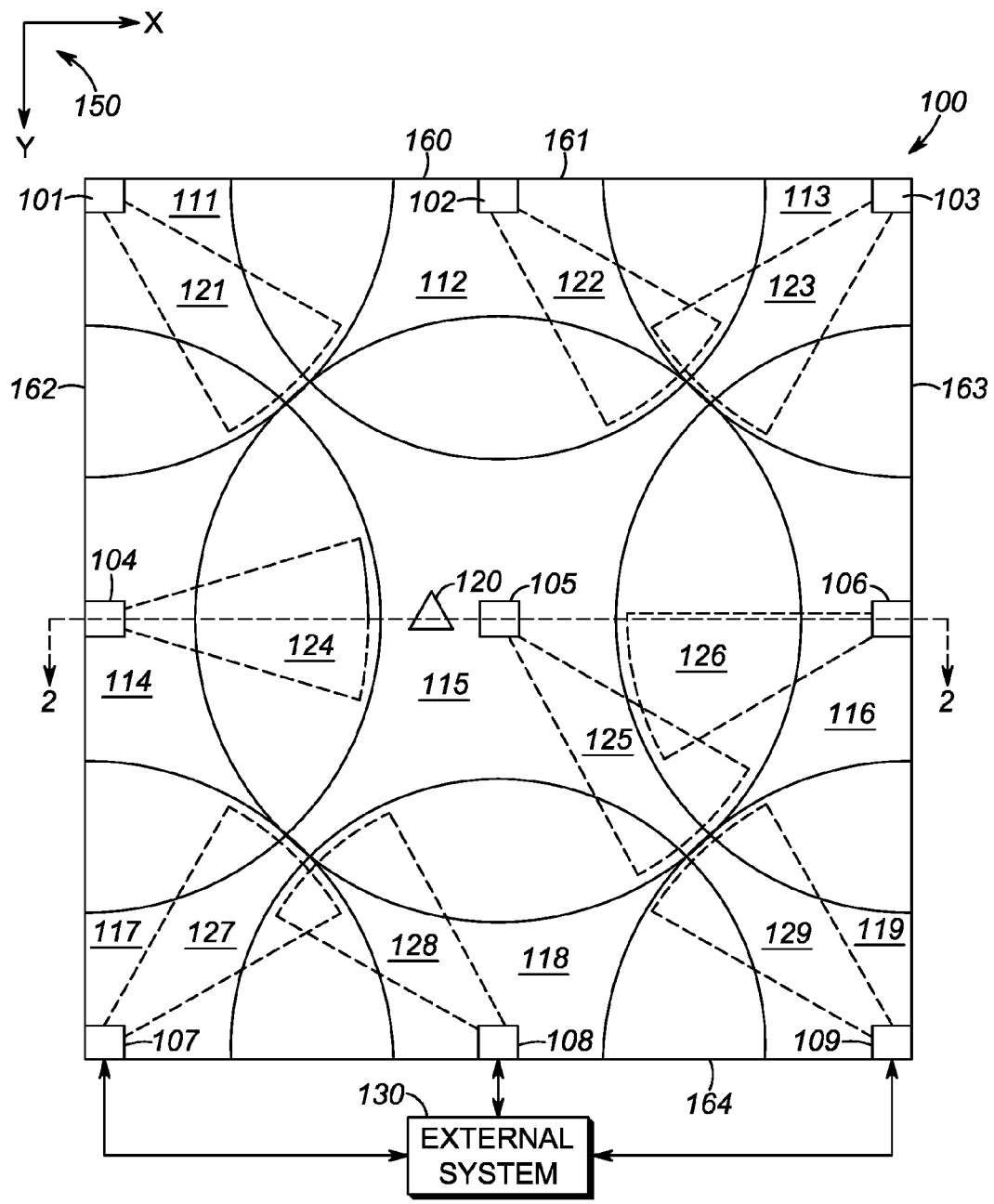
FIG. 1 is a top view of a simplified depiction of vision-based inventory analysis system deployed in a controlled area, in accordance with an example embodiment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for transmitting an image for inventory monitoring is provided herein. During operation, a camera may take a series of images of a particular area to be monitored. Each image will be broken into a plurality of regions and a determination will be made if a region is at least partially blocked. Those regions deemed unblocked will be utilized to generate a composite image. The camera continues acquiring images and unblocked regions are used from the images until a complete composite image is formed without obstructions. The composite image will then be transmitted and used for inventory monitoring.

Because the images transmitted for inventory monitoring will be obstruction free, the need to retransmit images will be greatly reduced. This reduction in transmitted images will greatly reduce the bandwidth utilized by the inventory monitoring system, reducing costs. In addition, the number of images taken by the camera can be greatly reduced since a camera does not need to continuously acquire images until an image is obstruction free.

Expanding on the above, there exist a number of fixed features associated with a shelf view of inventory which are independent of product stock level. These are preferably features associated with the edge of the shelf. At its simplest, the shelf edge facing a camera will have a distinctive color (which is occasionally interrupted by a label). This distinctive color acts as a reference. If the color is missing from the one of these reference points where it is expected, then that area and probably the area above and below are blocked. (People in the store would be the most common blockage and they have a vertical orientation.) Although the presence of the reference points are checked locally in the device, deciding what should be used as reference points would typically occur as part of an external system based on previous pictures. With the external system defining the reference points, the above solution could adapt to changing conditions. Reference definition/description changes would be downloaded to the device while a picture is being sent.

An object removal engine within customer premise equipment creates a composite result picture from a number of regions, which in a preferred embodiment comprises unblocked vertical picture strips. More particularly, each image is divided into dozens of vertical strips. The composite image starts off blank and has unobstructed vertical strips transferred to it as they become available. A series of photos are captured, each strip is checked to see if the reference features are present and if they are, then the strip is deemed unblocked and it is merged with the composite image. (If the reference features aren't present, then it is assumed that the strip is at least partly blocked.) The process continues transferring unblocked strips into the result until all the strips are filled or a predetermined time period has expired. This is illustrated below with reference to FIG. 7 through FIG. 12.

FIG. 1 is a top view of a simplified depiction of vision-based inventory analysis system 100 deployed in a controlled area 160, in accordance with an example embodiment. FIG. 1 should be viewed in conjunction with FIG. 2, which is a side view of the vision-based inventory analysis system 100 of FIG. 1 along line 2-2, in accordance with an example embodiment. System 100 includes a plurality of cameras 101, 102, 103, 104, 105, 106, 107, 108, 109 deployed in a controlled area 160, one or more products 120, and an external system 130 (sometimes referred to as a central server 130, an inventory monitoring system 130, a planogram compliance system 130, or a planogram compliance server 130) communicatively coupled with the plurality of cameras 101-109 through customer premise equipment (not shown in FIG. 1 or FIG. 2). It should be noted that although external system 130 is shown as a central server, system 130 may comprise a distributed server system or cloud server. Although nine cameras 101-109 are illustrated in FIG. 1, the number of cameras 101-109 may be any integer number, N, where N may be from 1 to potentially hundreds of cameras 101-109. In addition, although only one product 120 is illustrated in FIG. 1, the number of products 120 may be any integer number, M, where M may be from 1 to potentially thousands of products 120. It should be noted that product 120 may be stand-alone, or may exist on store shelves (not shown).

Figure 2:
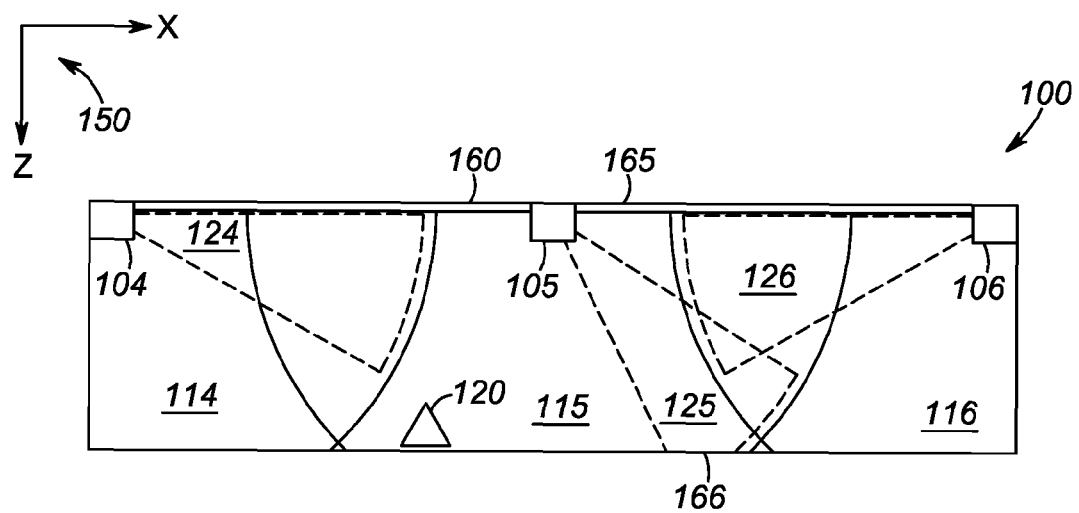
FIG. 2 is a side view of the system of FIG. 1 along line 2-2, in accordance with an example embodiment.

The controlled area 160 may comprise a store and may be defined, for example, by one or more walls 161, 162, 163, 164 (FIG. 1), a ceiling 165 (FIG. 2), and a floor 166 (FIG. 2), although the controlled area 160 need not be so defined. Cameras 101-109 are positioned in fixed locations throughout the controlled area 160. For example, as indicated in FIG. 2, cameras 101-109 are affixed to the ceiling 165 of the controlled area 110. However, this is not a necessity. Although a controlled area 160 having a substantially rectangular shape is depicted in FIG. 1, and the cameras 101-109 are shown to provide complete coverage of the controlled area 160, embodiments of the inventive subject matter may be used in any size or shape of controlled area 160, and/or the controlled area may not be bound by walls, and/or the cameras may be deployed so that only partial coverage of the controlled area is established.

Each camera 101-109 is configured to acquire a plurality of images of products 120 that are located within a field of view associated with the camera 101-109 (e.g. field of views 111, 112, 113, 114, 115, 116, 117, 118, 119), and to transmit the composite image to customer premise equipment, and ultimately to external system 130.

According to an embodiment, in order to provide for dynamic adjustment of the orientation of each camera 101-109, each camera 101-109 may be configured to change the physical orientation of its field of view with respect to a fixed coordinate system 150. Although coordinate system 150 is shown in two dimensions (xy), one of ordinary skill in the art will recognize that the described system would easily be deployed in a three-dimensional area resulting in camera orientation including pan, tilt, and zoom. This results in adjustments to an angular orientation of each camera 101-109 with respect to a three-dimensional coordinate system. This enables a product 120 located anywhere within the premises to be detected, despite the narrowness of any particular camera's field of view. For example, although product 120 is not shown to be within the detection field of view 125 of camera 105 in either FIG. 1 or FIG. 2, a drive system associated with camera 105 may rotate the camera, and thus the field of view 125, to include the location of product 120, thus enabling detection of product 120.

According to an embodiment, system 100 supports various types of communications between external system 130 and cameras 101-109: control signals from external system 130 to cameras 101-109, as mentioned above; and the image from cameras 101-109 to external system 130. As will be described in more detail later, the camera control information may include polling parameters, such as the times, frequencies, and/or durations of polling operations to be performed by the cameras 101-109. Additionally, the camera control information may comprise a request for an image, or, there may be a schedule known by the local camera system, 300, that causes the local camera system send images without the external system requesting them individually. Additional communications between the external system 130 and cameras 101-109 may be supported by system 100, for example, cameras 101-109 may send status information to external system 130.

In addition, the scheduling parameters may include scheduling camera selections and scheduling camera activation durations, among other things. The control signals from external system 130 to cameras 101-109 also may include signals that dynamically control the orientation adjustment mechanisms of each of the cameras 101-109. More specifically, the external system 130 may provide signals to an orientation adjustment mechanism to which a camera 101-109 is affixed, in order to change the angular orientation of the detection field of view with respect to fixed coordinate system 150. In an embodiment in which a camera also is coupled to each orientation adjustment mechanism, additional control signals from external system 130 may control when the camera actively captures images, the zoom level for image capture, and other controllable settings relating to image capture.

The composite image sent from the cameras 101-109 to the external system 130 comprises visual representations of products 120. The image enables the external system 130 to establish or maintain knowledge of all detectable products 120 that are within the controlled area 160. This knowledge may be utilized to determine out-of-stock conditions as well as planogram compliance.

External system 130 may be, for example, an inventory monitoring system, a planogram compliance system, a security system, or any of a variety of systems that may benefit from vision-based technologies employed in the various embodiments. For purposes of example, the remainder of the description below describes the external system 130 as being an inventory monitoring system. However, the description of an embodiment in which external system 130 is an inventory monitoring system should not be construed as limiting the scope of the inventive subject matter to a system that includes an inventory monitoring system. Instead, various types of external systems 130 (e.g., a planogram compliance system) may be used in conjunction with the various embodiments.

Figure 3:
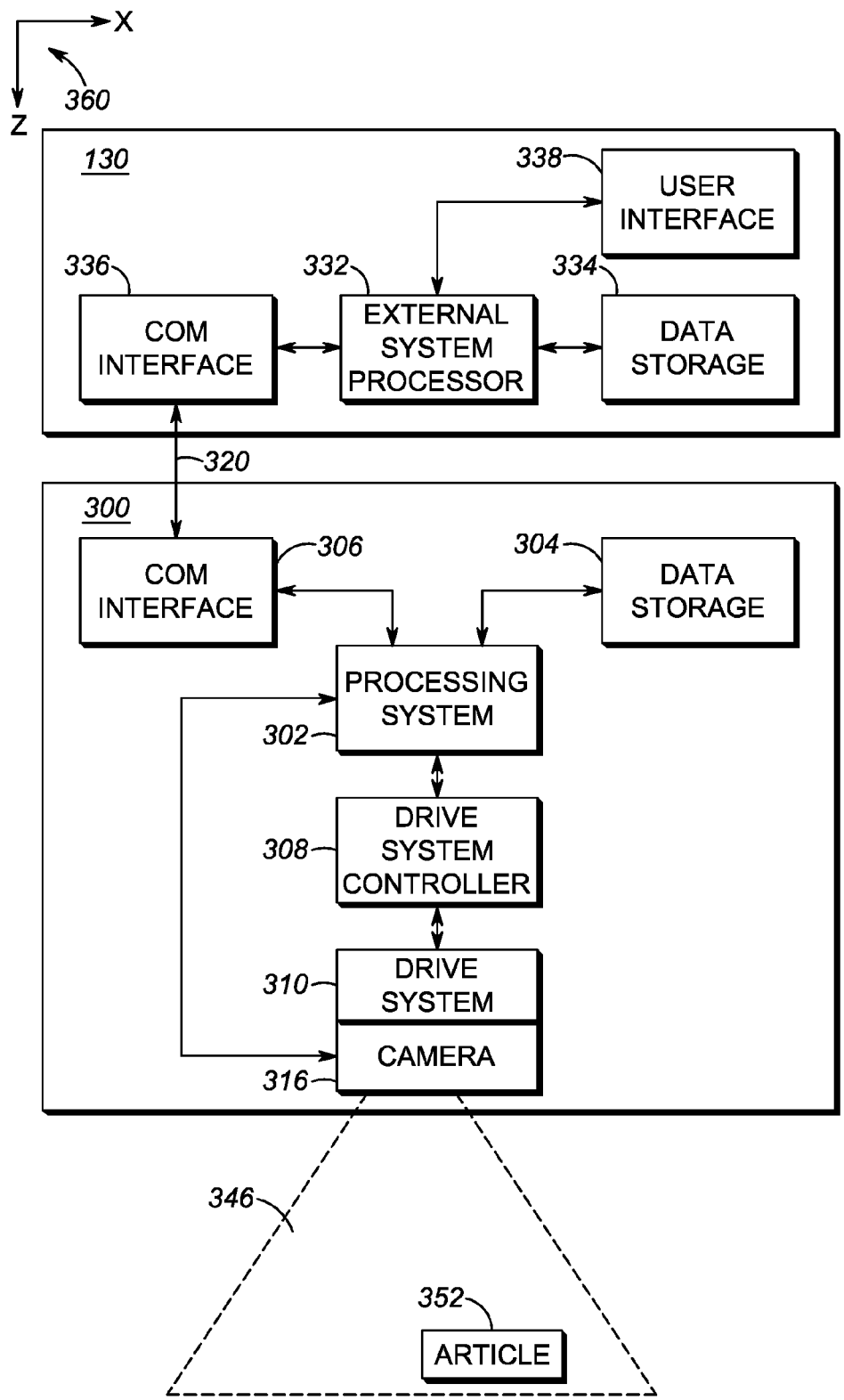
FIG. 3 is a simplified block diagram of a system coupled with an external system, in accordance with an example embodiment.

FIG. 3 is a simplified block diagram of a premise equipment 300 coupled with a central server 130, in accordance with an example embodiment. It should be noted that premise equipment may comprise "customer" premise equipment located within a store selling article 352, however, in alternate embodiments "premise" may refer to such locations as a warehouse, a depot, distribution center, archival facility, or any other facility housing article 352.

Premise equipment 300 and central server 130 exchange various data and control signals through link 320 via communications (COM) interfaces 306, 336, respectively. Communications interfaces 306, 336 may be wired or wireless (i.e., RF) interfaces, which may implement any of a number of communications protocols.

Premise equipment 300 includes processing system 302 that serves as object removal engine, data storage 304 that serves to store camera images and a composite image, communications interface 306, at least one camera 316. As will be described in more detail later, processing system 302 comprises a microprocessor that is configured to coordinate the operations of the camera and the orientation adjustment mechanism based on control signals received from central server 130 via communications interface 306. In addition, processing system 302 is configured to coordinate transmission of various types of data to the central server 130 via the communications interface 306, where the data may include one or more types of data such as, but not limited to angular orientation data (from the orientation adjustment mechanism), image data (from camera 316), image capture settings, log files, and status indications Camera 316 is configured to capture still images within a field of view 346, and to produce image data corresponding to the images. Camera 316 may report the image data to the central server 130 as a composite image via processing system 302 and communications interface 306, in an embodiment. Camera 316 may have a zoom capability (i.e. the ability to provide image data with increased resolution within a narrower portion of the field of view 346) that is controllable based on control signals received from processing system 302.

The orientation adjustment mechanism includes at least one drive system controller 308 and at least one drive system 310, in an embodiment. The drive system 310 includes one or more controllable servomotors, which control the physical position of an attachment structure (not shown). More specifically, the drive system 310 may cause the attachment structure to be rotated, with respect to a fixed coordinate system 360, about one, two, or three axes, in order to dynamically move the attachment structure in a desired manner or to position the attachment structure in a desired static position.

According to an embodiment, camera 316 also is physically and rigidly coupled to the drive system 310 (or more specifically, the attachment structure) so that the physical orientation of camera 316 may be adjusted. Adjustments to the physical orientation of camera 316 result in adjustments to the angular orientation of the field of view 346 of camera 316 with respect to the fixed coordinate system 360. When camera 316 has a zoom capability, the combination of the drive system 310 and the camera 316 may be considered to comprise portions of a pan-tilt-zoom (PTZ) camera system.

As indicated above, the drive system controller 308 is communicatively coupled with the drive system 310, and is configured to provide control signals to the drive system 310 that cause the drive system 310 to change the physical orientations of camera 316 (and thus field of view 346) and camera 316 (and thus field of view 346) with respect to the fixed coordinate system 360. Drive system 310 and/or drive system controller 308 are configured to produce angular orientation data indicating the angular orientation of the camera 316 (and thus field of view 346) and camera 316 with respect to the fixed coordinate system 360.

Processing system 302 receives the image data from camera 316, and the angular orientation data from drive system 310 or drive system controller 308, in an embodiment. Some or all of this information may be stored, at least temporarily, in data storage 304. Processing system 302 may then transmit some or all of the received information to central server 130 (via communications interface 306) in a manner that enables central server 130 to correlate the information in time. For example, processing system 302 may timestamp each type of information prior to storage and/or transmission. For example, processing system 302 may form a data packet (for transmission) with such temporally proximate information. In an alternate embodiment, one or more of camera controller 312, drive system controller 308, and camera 316 may timestamp its own information and send the information to central server 130 via communications interface 306 directly (e.g. without processing system 302 intervening). Either way, the ability of central server 130 to correlate the various types of information produced by premise equipment 300 enables the system 300 to be used for a number of advantageous purposes.

As indicated above, communications interface 306 of premise equipment 300 is an external system interface, which is configured to communicate image data, and angular orientation data to central server 130. In a system that includes one or more additional cameras (e.g. the system of FIGS. 1 and 2), central server 130 is configured to receive image data, and angular orientation data from the additional vision-based inventory analysis systems, as well.

Central server 130 includes external system processor 332, data storage 334, communications interface 336, and user interface 338, in an embodiment. Although central server 130 may be any of a variety of types of systems (e.g. an inventory monitoring system, a security system, and so on), an example of the functionality of central server 130 as an inventory monitoring system is discussed below for purposes of illustrating an example embodiment.

External system processor 332 includes one or more general or special purpose processors and associated memory and other circuitry, which is configured to enable external system processor 332 to provide control signals (via communications interface 336) to premise equipment 300. The various control signals provided by external system processor 332 may include, for example, signals that control the, schedule, timing and duration of polling operations (i.e. operations performed by the camera to attempt to capture images of products), signals that control activation and operation of camera 316 (e.g. focus, lighting, zoom settings, and so on), signals that cause the drive system controller 308 to move the camera 316 and camera 316 to certain positions, and signals that cause the drive system controller 308 to move the camera 316 and camera 316 through various pan and tilt ranges (at controllable rates), and signals that cause a particular camera to provide an image, or a portion of an image in color.

In addition, external system processor 332 is configured to process image data, and angular orientation data received from premise equipment 300 (via communications interface 336). For example, when central server 130 is an inventory monitoring system, external system processor 332 is configured to maintain inventory information (e.g. in data storage 334) regarding quantities of a plurality of articles that are present within a controlled area (e.g. controlled area 160, FIG. 1) based on the image received from premise equipment 300. More specifically, in response to receiving a composite image from premise equipment 300 (and possibly the transaction status of the associated article), external system processor 332 may update the inventory information regarding quantities of the article present in the controlled area, in an embodiment.

In addition, because video or image information may be correlated with angular orientation data, external system processor 332 may be capable of determining specific physical locations of various articles. For example, in an embodiment, the location of premise equipment 300 within a controlled area is known by external system processor 332, along with the installation orientation of the premise equipment 300 (i.e. the fixed orientation of attachment of the premise equipment 300 within the controlled area with respect to the fixed coordinate system 360). In order to determine a location within the controlled area of a particular image that has been acquired by the premise equipment 300, geometrical analysis is performed using the angular orientation data for the image and the known physical location of the premise equipment 300 to determine, at least, a direction in which camera 316 was pointing at the time when the image was detected by the premise equipment 300. The determined direction may be correlated with a particular location within the controlled area.

In this particular embodiment, external system processor 332 serves to analyze the composite image received from system 300 and use image-recognition algorithms to identify particular products within images/video received. The particular products identified, and their locations may be used as part of inventory control in order to identify missing products.

User interface 338, which is communicatively coupled with the external system processor 332, is configured to provide inventory-related information (e.g. representations of inventory) to a human user, and to initiate and/or alter the execution of various processes that may be performed by the premise equipment 300. For example, user interface 338 may be configured to provide a graphical user interface (GUI), which enables a user to view lists or other representations of identified products that have been detected by processor 332. In an embodiment in which central server 130 is an inventory monitoring system, for example, user interface 338 may be configured to provide representation of current inventory (e.g. quantities of articles in inventory, locations of articles in inventory, and so on) in pictorial and/or textual forms. After an inventory has been established, user interface 338 may be manipulated by the user to convey (e.g. display) inventory information to the user. The inventory information may be conveyed in any of a number of formats, including lists, reports, spreadsheets, and graphical depictions. For example, inventory information may be displayed to the user as a planogram, which provides information about the location of products within the controlled area, including the locations of desired or misplaced articles. For articles that are misplaced, the user interface 338 additionally may display the correct locations for those articles, which enables store personnel to efficiently organize inventory in a desired way. And for cases where the inventory and shelf displays are maintained by organizations outside the store, it enables these external resources to determine when their attention is needed.

In addition, user interface 338 may enable the user to initiate a polling or inventory taking process, and/or to establish or modify parameters relating to polling or inventory taking processes. These parameters may include, for example, schedules, times, frequencies, and/or durations of polling operations to be performed by the camera of premise equipment 300, pan/tilt rates and ranges to be implemented by drive system controller 308 and drive system 310, control parameters for camera 316 (e.g. zoom settings and whether or not camera 316 is active or inactive during the polling operations), and data capture settings, among other things.

In order to provide the above features (and additional features), user interface 338 may include a computer, a monitor, a keyboard, a touch screen, a mouse, a printer, and various other hardware components to provide a man/machine interface. In an embodiment, user interface 338 and external system processor 332 may include distinct hardware components. In such an embodiment, user interface 338 may be co-located or remotely-located from external system processor 332, and accordingly user interface 338 may be operably connected with external system processor 332 via wired, wireless, direct, or networked connections. In an alternate embodiment, user interface 338 and external system processor 332 may utilize some shared hardware components (e.g. processors, memory, and so on).

As discussed above, in vision-based inventory analysis systems, bandwidth is a significant cost of operating the service. Reducing that cost would increase the competitiveness and/or margin of any vision-based inventory analysis system. In order to address this issue, processing system 302 will merge multiple images to form an unobstructed composite image. The unobstructed composite image will then be transmitted over link 320 via communications (COM) interfaces 306, 336.

External system processor 332 will utilize algorithms that operate on unobstructed composite images, so bandwidth can be saved by transmitting unobstructed composite images between communication interfaces instead of multiple images needed to obtain the information necessary for analysis.

Figure 4A:
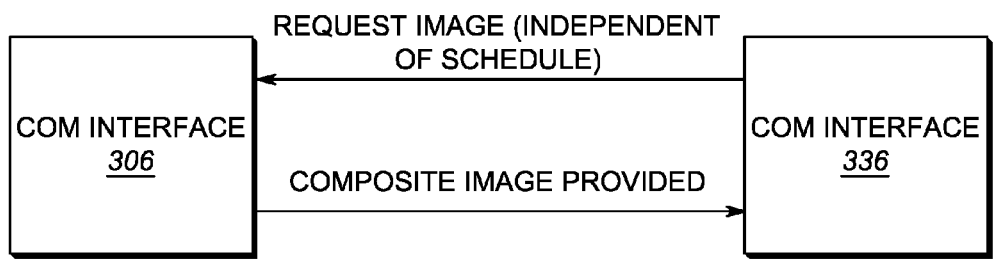
FIG. 4a illustrated communications between systems.

The request for an image may comprise a message sent from com interface 336 to com interface 306 using a particular bit to indicate whether or not the image is to be transmitted. Of course information such as camera identification, orientation angle, zoom may be included in the message as well. The above process can be illustrated in FIG. 4a. As shown, a request for an image is received by com interface 306 from com interface 336. In response, com interface 306 provides the image as an unobstructed composite image.

Figure 4B:
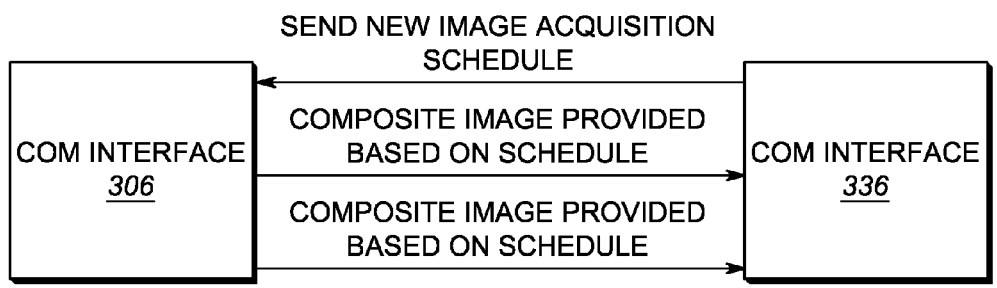
FIG. 4b illustrated communications between systems.

FIG. 4b shows an alternative approach were a schedule is sent from the remote system communications interface, 336, to the local communications interface. This schedule is used for the local system, 300, to capture and send image data to the extern system, 130 the external system requesting it each time.

Figure 5:
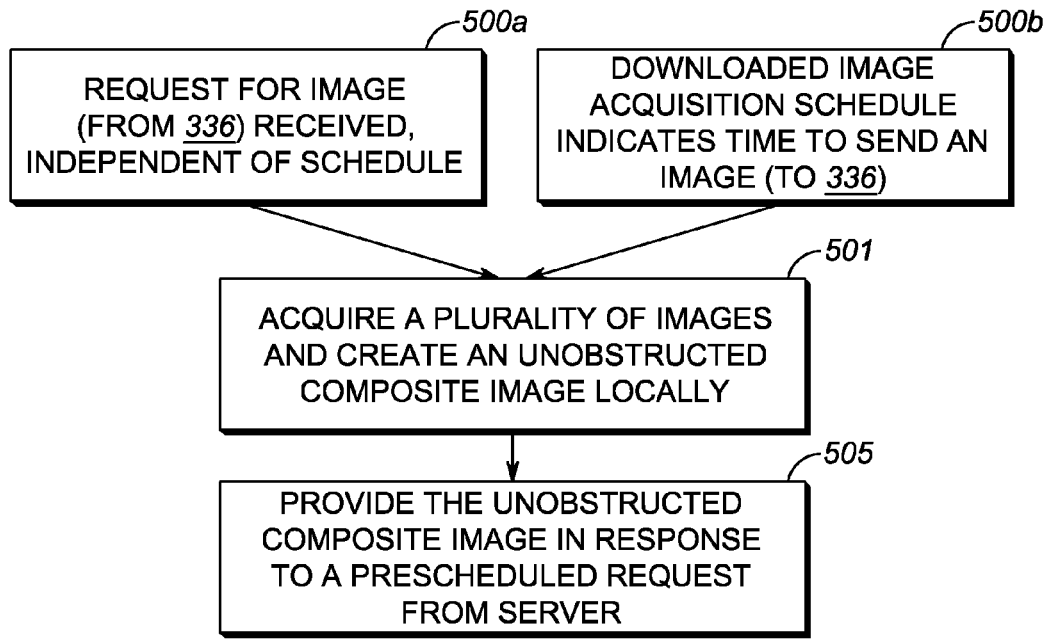
FIG. 5 is a flow chart showing operation of vision-based inventory analysis system of FIG. 3.

FIG. 5 is a flow chart showing operation of system 300. The logic flow begins at steps 500a or 500b. Step 500a covers the case where a request from the external system 130, triggers the creation of a composite image. Step 500b covers the case where a pre-existing schedule triggers the creation of a composite image. At step 501 the processing system 302 receives a plurality of images from camera 316 and converts the images to an unobstructed composite image. At step 505 processing system 302 provides a composite image to communications interface 336, and ultimately to central server 130.

Figure 6:
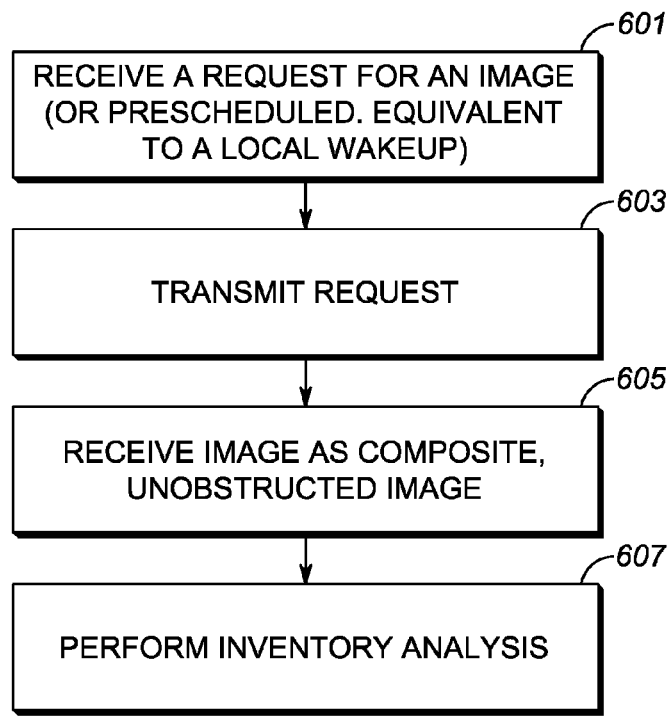
FIG. 6 is a flow chart showing operation of the external system of FIG. 3.

FIG. 6 is a flow chart showing operation of central server 130. The logic flow begins at step 601 where processor 332 receives a request for a particular image or a preloaded schedule (e.g., a local wakeup) triggers the need for an image. The schedule may identify specific times rather than something strictly periodic, like every hour. This request may be received from user interface 338 or may simply be part of a periodically generated automatic request. At step 603 a request is transmitted from interface 336 to interface 306. The requested image is received and at step 605 as a composite, unobstructed images formed from multiple images. Finally, at step 607 inventory analysis (e.g., planogram compliance, out of stock situations, etc.) is performed by processor 332 using the unobstructed, composite image.

FIG. 7 through FIG. 12 illustrates the generation of an unobstructed, composite image from multiple images. Preferably, these steps are performed by processing system 302, however, in alternate embodiments of the present invention, these steps may be performed by camera 316, or external system processor 332. More specifically, while the above invention was described with premise equipment 300 generating the composite image, this functionality may be moved to the server side. During this scenario, multiple images will be provided to external server 130, with server 130 generating the composite image.

Figure 7:
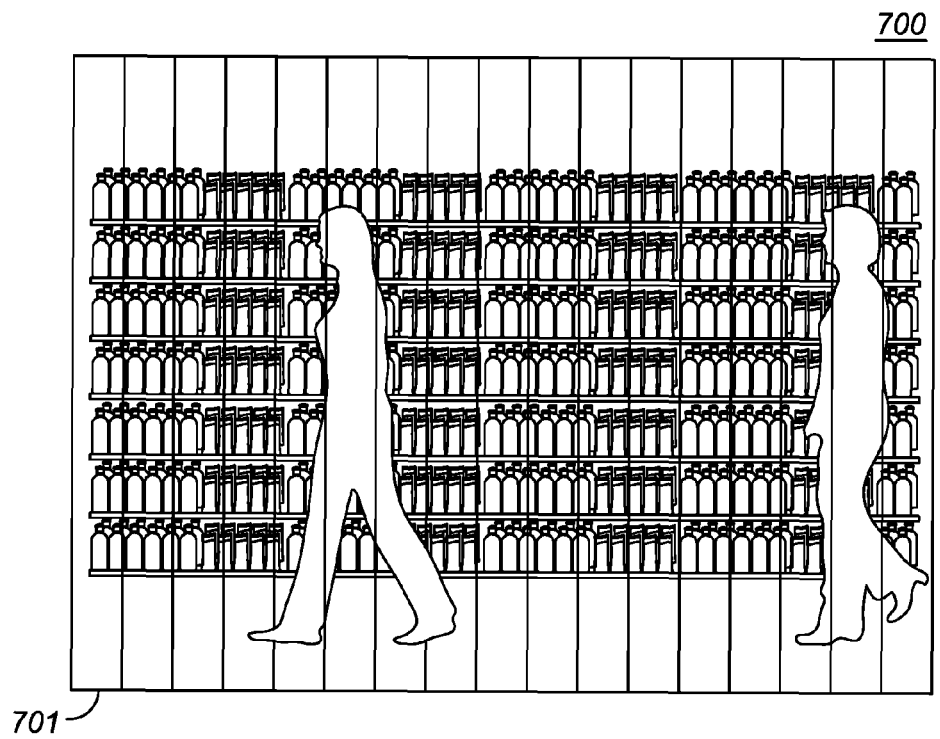
FIG. 7 through FIG. 12 illustrates the creation of a composite image.

As shown in FIG. 7 an initial image is acquired by camera 316 and provided to processor 302. Processor 302 divides the image into a plurality of regions 701 (only one labeled). In this particular embodiment, each image is divided into a plurality of strips 701. As discussed above, each strip is analyzed to determine if it is blocked/occulted. This is accomplished by processor 302 determining if the reference features are present in each strip, and if they are, then the strip is deemed unblocked and it is merged with the composite image.

Figure 8:
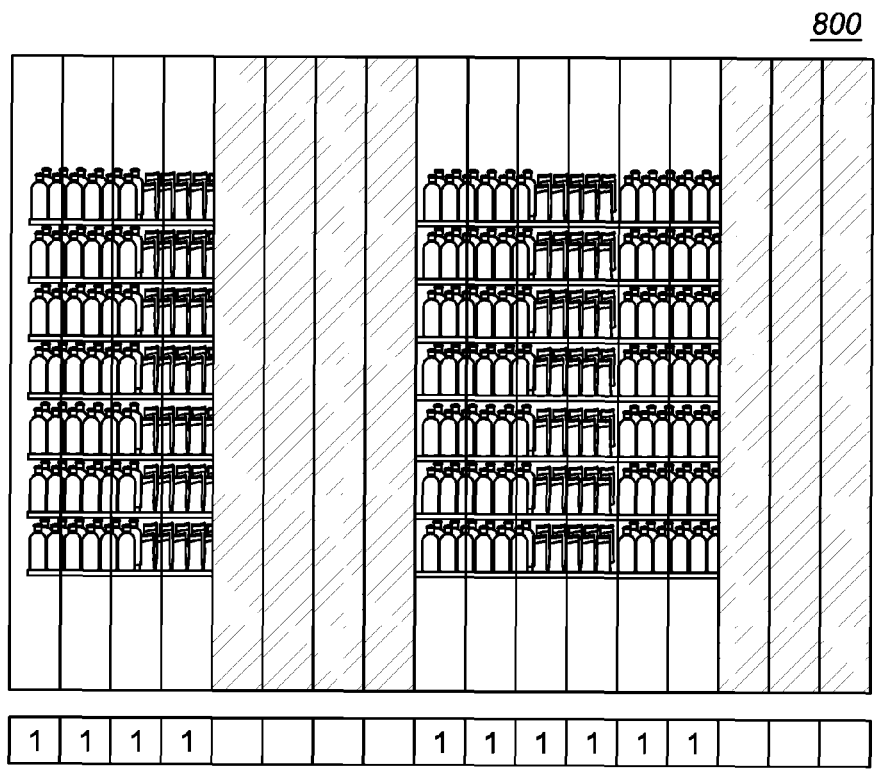
Figure 9:
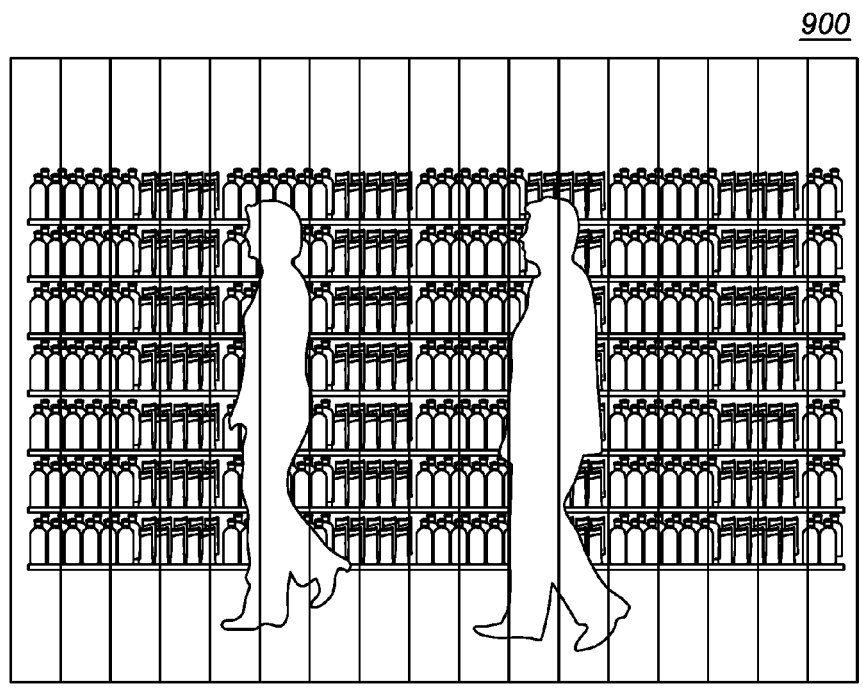
Figure 10:
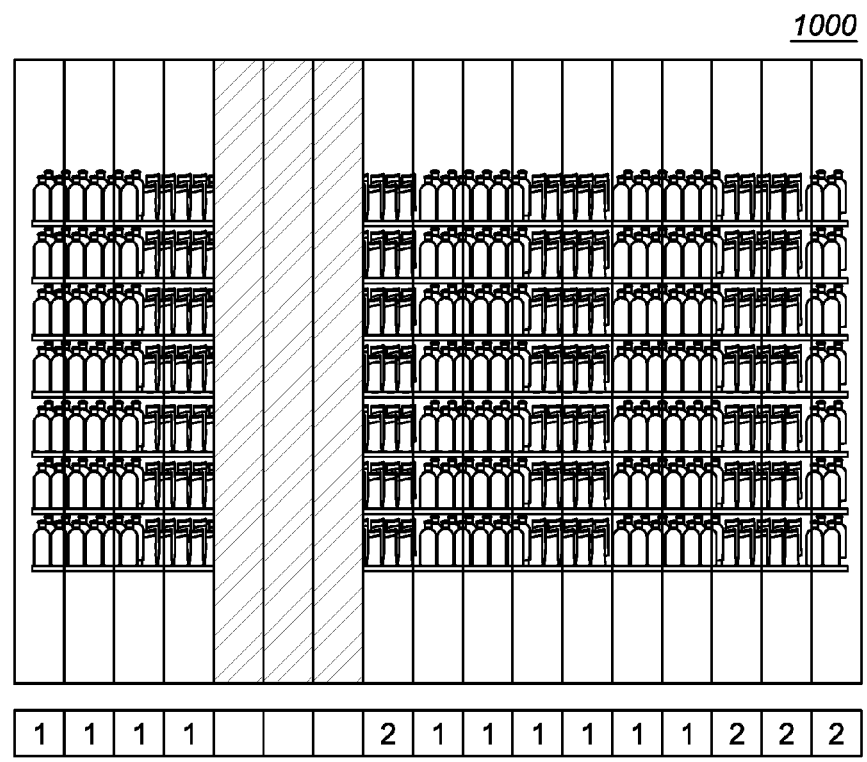
Figure 11:
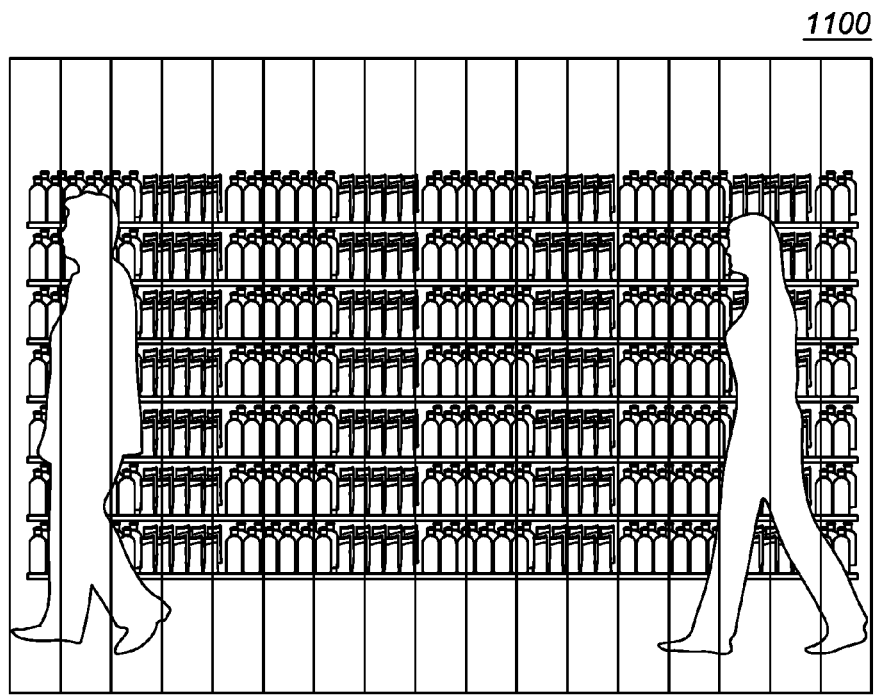
Figure 12:
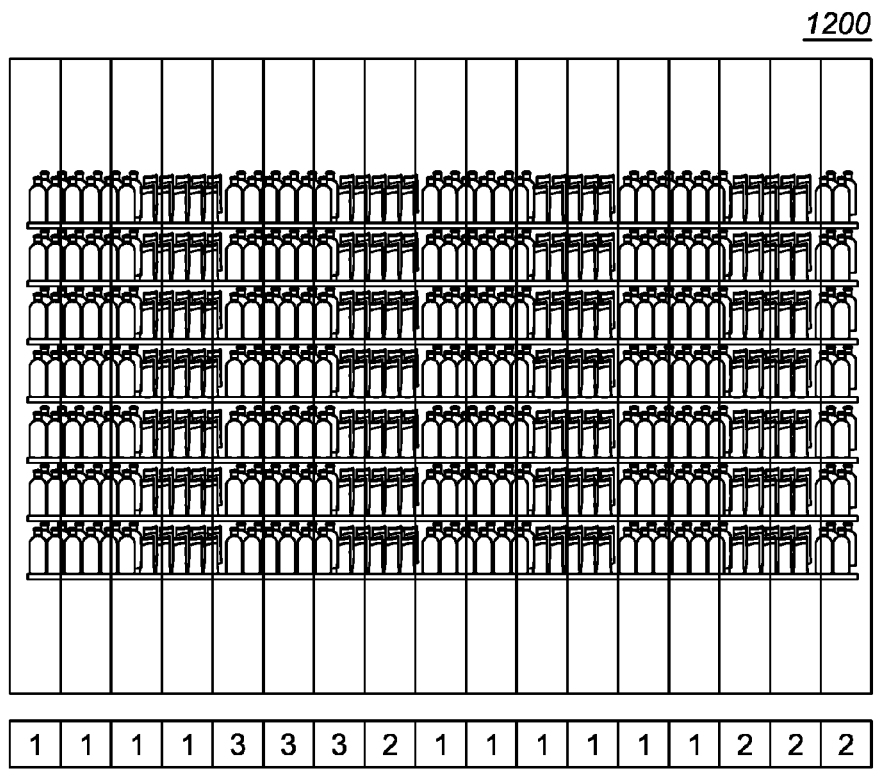

As is evident, two individuals are blocking some of the merchandise in FIG. 7. Since the reference features within these strips will also be blocked, these strips are not merged by processor 302 with a composite image. The composite image is shown in FIG. 8 as image 800. As shown, image 800 comprises only those unblocked strips from image 700. During its formation, composite image 800 will be stored in storage 304. Image 800 in FIG. 8 has seven strips that were blocked and need to be "filled".

Because image 800 has "empty" strips, processor 302 will request additional images from camera 316. An additional image 900 will then be received. As is evident, three of the seven strips in image 800 are not blocked, and will be used to "fill" image 800, resulting in composite image 1000 in FIG. 10. As is evident, three strips remain to be "filled". Therefore, processor 302 will request another image from camera 316. The image is provided as image 1100. As is evident, all remaining strips to be filled are unblocked in image 1100. These strips will be used to ad onto image 800, creating composite image 1200. Composite image 1200 is then stored and transmitted.

Figure 13:
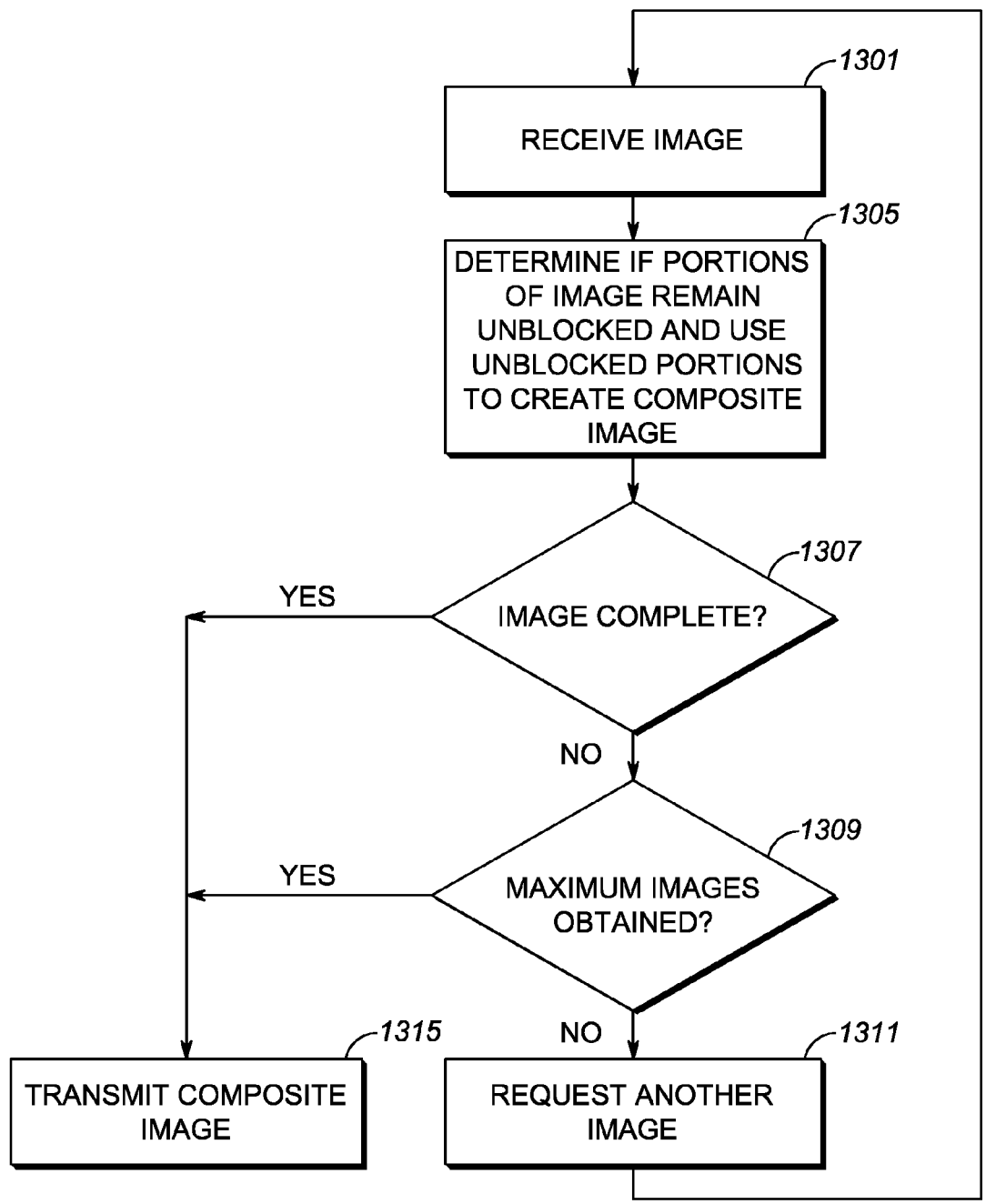
FIG. 13 is a flow chart showing operation of the processor of FIG. 3 when creating a composite image.

FIG. 13 is a flow chart showing operation of processor 302 when creating a composite image. The logic flow begins at step 1301 where processor 302 receives an image from camera 316. This image may comprise a first image or any number of subsequent images until a maximum number of images is obtained. Once an image is received, processor 302 determines if any portions of the image remain unblocked, and uses the unblocked portions to create a composite image. As discussed above, a composite image is created from multiple unblocked portions from multiple images.

At step 1307 processor 302 determines if the image is complete by determining if a portion of the composite image remains blocked. If it has been determined that the composite image is complete, the logic flow continues to step 1315 where the composite image is transmitted by a communications interface. However, if the image is not complete, the logic flow continues to step 1309 where processor determines if a maximum number (e.g., 10) images were obtained from the camera.

Step 1309 may be necessary where a portion of an image is blocked for long periods of time. For example, if someone places a box, or another item within a camera's field of view for long periods of time, step 1309 prevents images being continuously taken while the obstruction is present. If, at step 1309 it is determined that the maximum number of images has been obtained, then the logic flow continues to step 1315 where the blocked portion is included in the composite image.

If, however, processor 302 determines that the maximum number of images has not been obtained, then the logic flow continues to step 1311 where processor 302 requests another image from camera 316, and the logic flow returns to step 1301 where a second image is received unblocked regions of the second image are merged with unblocked regions of the first image to form the composite image.

As discussed above, the process of determining that any image is blocked or unblocked is achieved by identifying the presence of absence of specific image features at specific locations in an image, with the absence of one or more features is used to determine that an area of the image is blocked.

It should be noted that step 1305 is described as producing a binary output (blocked or unblocked) for the portions of the image and building the composite images from unblocked portions. As an alternative, to this binary approach, the portions could be scored as to how much they are blocked, based on the fraction of reference features in a portion that are recognized as unblocked. The confidence of the blocked or unblocked status of the reference features could also be used to create a score or confidence measure for the conclusion that a portion is blocked. The composite image could then be constructed of image portions that are most confidently unblocked. This may be more robust than a strictly binary (blocked or unblocked) approach. With this in mind, an alternate embodiment may identify the relative level of blockage of each region in the current image, compare this level of blockage to the level of blockage of the corresponding region in the composite image, and merge the current image region into the corresponding composite region if the current image region has less blockage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
generating, by a processor, a composite image by merging unblocked portions of first and second images, each of the first and second images being representative of an environment;
identifying, by the processor, a blocked portion of the first and second images;
determining, by the processor, whether the blocked portion has been blocked for greater than a threshold amount of time; and
in response to determining that the blocked portion has been blocked for greater than the threshold amount of time, including, by the processor, the blocked portion in the composite image.

2. A method as defined in claim 1, further comprising, in response to determining that the blocked portion has been blocked for greater than the threshold amount of time, transmitting the composite image with the blocked portion included in the composite image.

3. A method as defined in claim 1, further comprising, in response to determining that the blocked portion has been blocked for less than the threshold amount of time, not including the blocked portion in the composite image and determining whether the blocked portion remains blocked in a third image representative of the environment.

4. A method as defined in claim 3, further comprising, in response to determining that the blocked portion is unblocked in the third image, adding the unblocked portion from the third image to the composite image.

5. A method as defined in claim 1, wherein determining whether the blocked portion has been blocked for greater than the threshold amount of time comprises:

determining that the composite image is incomplete; and
determining a number of images that has been obtained.

6. A method as defined in claim 1, wherein identifying the blocked portion comprises detecting an absence of an image feature at a location in the first and second images.

7. An apparatus, comprising:
memory including machine-readable instructions; and
a processor configured to execute the machine-readable instructions to perform operations including:
generating a composite image by merging unblocked portions of first and second images, each of the first and second images being representative of an environment;
identifying a blocked portion of the first and second images;
determining whether the blocked portion has been blocked for greater than a threshold amount of time; and
in response to determining that the blocked portion has been blocked for greater than the threshold amount of time, including the blocked portion in the composite image.

8. An apparatus as defined in claim 7, wherein the operations include, in response to determining that the blocked portion has been blocked for greater than the threshold amount of time, transmitting the composite image with the blocked portion included in the composite image.

9. An apparatus as defined in claim 7, wherein the operations include, in response to determining that the blocked portion has been blocked for less than the threshold amount of time, not including the blocked portion in the composite image and determining whether the blocked portion remains blocked in a third image representative of the environment.

10. An apparatus as defined in claim 9, wherein the operations include, in response to determining that the blocked portion is unblocked in the third image, adding the unblocked portion from the third image to the composite image.

11. An apparatus as defined in claim 7, wherein determining whether the blocked portion has been blocked for greater than the threshold amount of time comprises:
determining that the composite image is incomplete; and
determining a number of images that has been obtained.

12. An apparatus as defined in claim 7, wherein identifying the blocked portion comprises detecting an absence of an image feature at a location in the first and second images.

13. A machine-readable storage device including instructions that, when executed, cause a machine to at least:
receive images representative of an environment;
generate a composite image formed of unblocked portions of the images;
determine that the composite image is incomplete;
determine whether the composite image has been incomplete for greater than a threshold amount of time; and
in response to determining that the composite image has been incomplete for greater than the threshold amount of time:
cease generation of the composite image; and
transmit the incomplete composite image.

14. A machine-readable storage device as defined in claim 13, wherein the instructions, when executed, cause the machine to, in response to determining that the composite image has been incomplete for less than the threshold amount of time, continue the generation of the composite image.

15. A machine-readable storage device as defined in claim 13, wherein ceasing generation of the composite image comprises not requesting an additional image.

16. A machine-readable storage device as defined in claim 13, wherein determining whether the composite image is incomplete comprises determining whether the composite image includes a blocked portion.

17. A machine-readable storage device as defined in claim 13, wherein the instructions, when executed, cause the machine to identify the unblocked portions by detecting an image feature at a location within the images.

18. A machine-readable storage device including instructions that, when executed, cause a machine to at least:
receive images representative of an environment;
generate a composite image formed of unblocked portions of the images;
determine that the composite image is incomplete, wherein determining whether the composite image is incomplete comprises determining whether the composite image includes a blocked portion;
determine whether the composite image has been incomplete for greater than a threshold amount of time; and
in response to determining that the composite image has been incomplete for greater than the threshold amount of time, cease generation of the composite image.

* * * * *